United States Patent [19]
Furness

[11] Patent Number: 4,659,017
[45] Date of Patent: Apr. 21, 1987

[54] VEHICLE MOUNTED CHEMICAL SOLUTION SPRAYING APPARATUS WITH AIR DEFLECTOR

[75] Inventor: Keith U. Furness, Eden Hills, Australia

[73] Assignees: Furness Caravans Pty. Ltd., Eden Hills; Waikerie Co-Operative Producers Ltd., Waikerie, both of Australia

[21] Appl. No.: 786,648

[22] Filed: Oct. 11, 1985

[51] Int. Cl.$^4$ .............................................. B05B 15/04
[52] U.S. Cl. ................................... 239/151; 239/164; 239/173
[58] Field of Search ............... 239/150, 151, 159–161, 239/163–169, 172–174, 176, 171, 507, 509–513; 47/1.5, 1.7, 1.42, 1.44

[56] References Cited

U.S. PATENT DOCUMENTS

| | | | |
|---|---|---|---|
| 800,454 | 9/1905 | Lamb et al. | 239/164 X |
| 1,767,828 | 6/1930 | Wratter | 239/150 |
| 2,029,166 | 1/1936 | Hales | 47/1.7 X |
| 2,641,505 | 6/1953 | Valois | 239/168 |
| 4,353,505 | 10/1982 | Kinder | 239/167 |

FOREIGN PATENT DOCUMENTS

| | | | |
|---|---|---|---|
| 552107 | 5/1986 | Australia . | |
| 2256714 | 9/1975 | France | 239/168 |
| 2455849 | 1/1981 | France | 239/159 |
| 622780 | 5/1949 | United Kingdom | 239/159 |
| 2157935 | 11/1985 | United Kingdom | 47/1.7 |

OTHER PUBLICATIONS

Massey, B. S. *Mechanics of Fluids* 4th Ed. (not dated) pp. 304–316.

*Primary Examiner*—Andres Kashnikow
*Assistant Examiner*—Mary Beth O. Jones
*Attorney, Agent, or Firm*—Baker, Maxham & Jester

[57] ABSTRACT

Spraying apparatus comprising a transversely extending air deflector carried by a frame and located forwardly of spray heads, the air deflector having sufficient downward component of direction that it exceeds the stalling angle when moved at an operating speed and thereby creates a low pressure zone behind the air deflector, said spray heads being oriented to direct spray into said low pressure zone.

8 Claims, 3 Drawing Figures

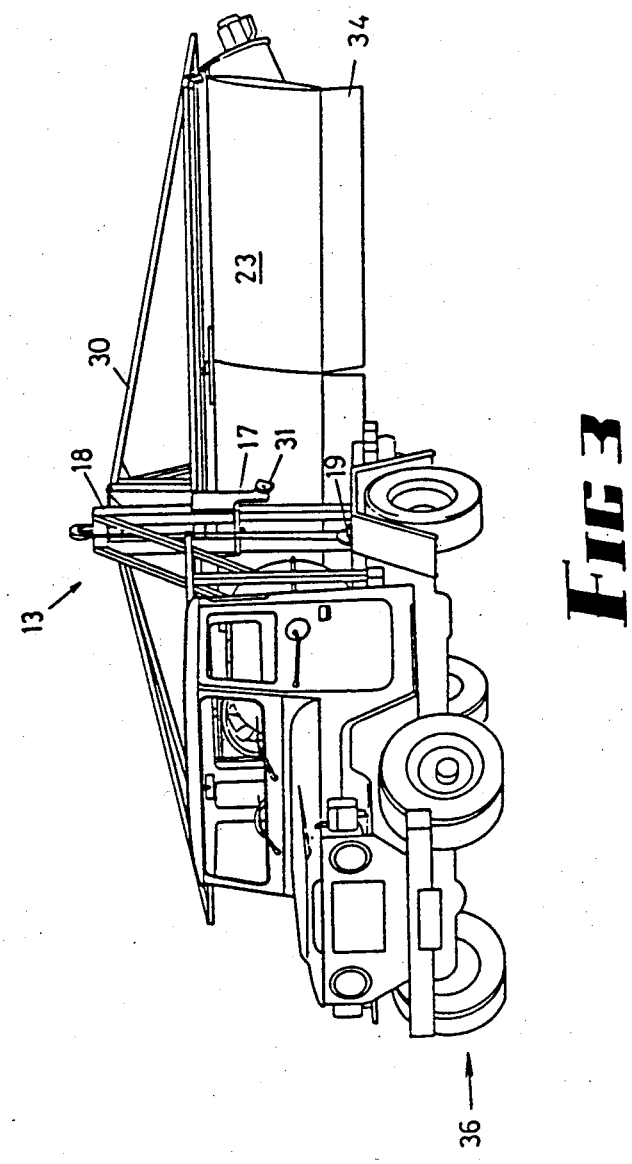

VEHICLE MOUNTED CHEMICAL SOLUTION SPRAYING APPARATUS WITH AIR DEFLECTOR

This invention relates to means for the spraying of weeds, crops or the like.

BACKGROUND OF THE INVENTION

In my Australian Application No. 82234/82, Pat. No. 552107 entitled SPRAYING MEANS AND METHOD, there was described means whereby very low volume but high concentrate spraying could be effected. The contents of the specification, claims and drawings of that said patent comprise the closest prior art known to the Applicant.

There are many applications for such spraying devices, including a requirement to be able to spray at high speed over terrain with a minimum of loss due to wind effects. One example of such a requirement is the spraying of weeds alongside a railroad track. It is known to be desirable to avoid the growth of weeds in the ballast itself, since such growth can cause accumulation of sand or dirt, but on the other hand it is desirable that the weeds be allowed to persist at the shoulders of the ballast, in order to inhibit the drift of sand or dust.

This requirement has been well recognised and it is common practice to spray weeds solely on the ballast with a dilute solution of weedicide drawn by a locomotive. However the costs of drawing very large quantities of water for the weedicide solution is very high and the main object of this invention is to provide an improvement whereby such costs can be considerably reduced, and whereby high concentrate low volume spraying can be incorporated.

However the difficulty which has been encountered heretofore has been the tendency for such spraying to be displaced by natural air turbulence, side winds and the like, since high concentration low volume spraying necessarily involves small droplet size. Another object of this invention is to provide means whereby such turbulence or side winds will have much less effect than heretofore and thereby the spraying can be more effective.

BRIEF SUMMARY OF THE INVENTION

In an embodiment of this invention spraying means comprises a transversely extending air deflector carried by a frame and located forwardly of spray heads, the air deflector having sufficient downward component of direction that it exceeds the stalling angle when moved at an operating speed and thereby creates a low pressure zone behind the air deflector, said spray heads being oriented to direct spray into said low pressure zone.

DESCRIPTION OF THE PREFERRED EMBODIMENTS

Figure 1:
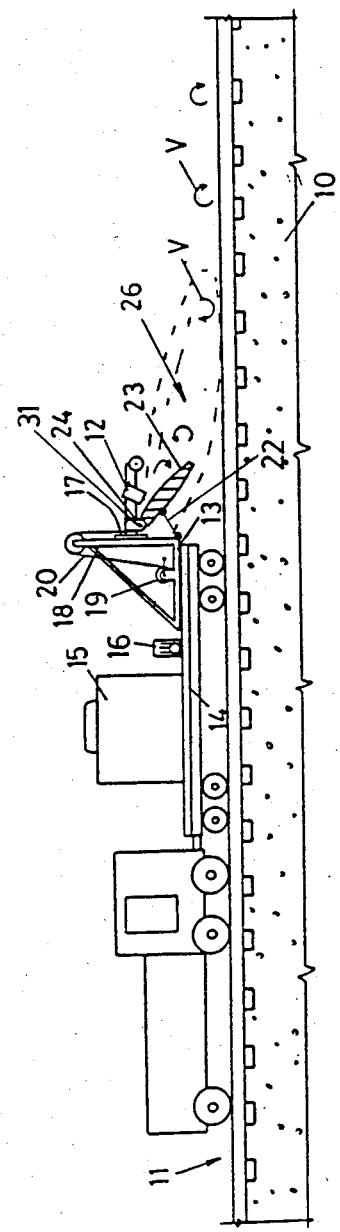
Figure 2:
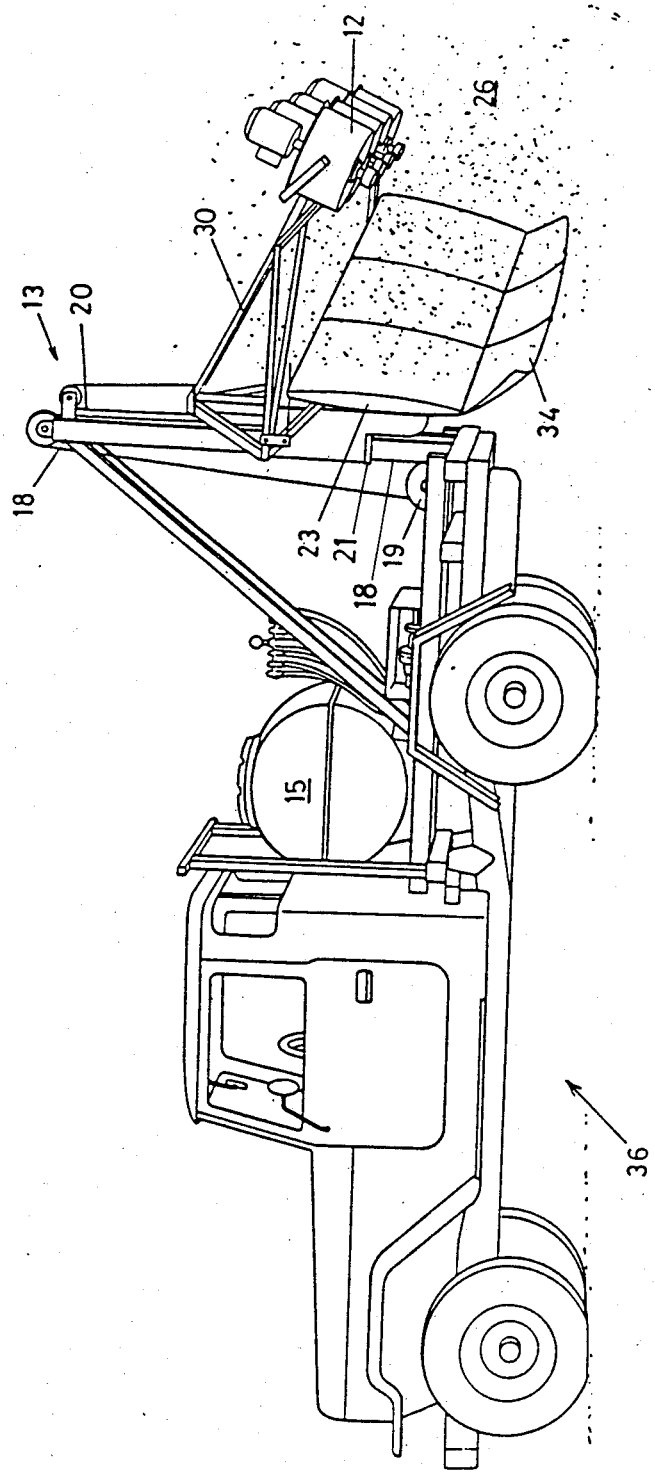

Two embodiments of the invention are described hereunder in some detail with reference to and are illustrated in the accompanying drawings in which:

FIG. 1 is a diagrammatic representation of a railway vehicle having the spraying means mounted thereon for spraying the ballast of a railroad track, FIG. 2 is a side elevation of a motor vehicle having the spraying means mounted thereon for the spraying of agricultural pasture, and FIG. 3 is a front perspective view of the machine of FIG. 2.

Referring first to the embodiment of FIG. 1, ballast 10 of a railway track 11 is sprayed by a plurality of high concentrate low volume spray heads 12 each of which is in accordance with Australian Pat. No. 552107. There is provided a frame 13 which is attached to a railway truck 14 which carries on it a tank 15 and pump 16. Elevating means comprises a carriage 17 which is guided for movement in a vertically extending track 18 which forms portion of frame 13, and elevation is effected by a windlass 19 coupled to carriage 17 by a cable 20. In the embodiment of FIGS. 2 and 3, the track engaging means are illustrated as slides 21 (FIG. 2).

An air deflector 23 is pivoted at 24 to carriage 17 and tilt control means 22 (of any known type) are provided for varying the angle of tilt. In the illustration shown in FIG. 1, the air deflector 23 is tilted downwardly by an amount which considerably exceeds what the stalling angle would be if deflector 23 were to constitute the wing of an aircraft, so that as the railway truck 14 moves along its track (say at a speed of 60 km/hour) there is a void space 26 behind the deflector 23 and this contains vortexes 'V' as illustrated, some of these vortexes 'V' being effective in causing the very small droplets of the mist like spray to be thrown downwardly so that loss due to side winds for example can be kept to an acceptably low level. (The term "stalling angle" is used herein in a general engineering sense, that is, the condition of tilt wherein flow separates from practically the whole of the upper, or downstream, surface. Under such a condition, vortexes 'V' form to be of considerable magnitude.)

Referring now to the second embodiment of FIGS. 2 and 3, a plurality of spray heads 12 are carried by a transverse suspension frame 30 which extends outwardly each side of the carriage 17, and the air deflector 23 (which can be a flat plate) is coupled thereto by means of pivot pins 31. For convenience, the air deflector 23 comprises three separate panels but they can be continuous if required. The frame 13 comprises an upstanding track 18 as in the first embodiment. The windlass is coupled by the cable 20 to the carriage 17. The frame 10, is carried on a truck 36 which also carries on it the tank 15 containing the concentrated spraying liquid.

The lower edges of the parts of the air deflector 23 have depending flexible flaps 34 which, when lowered, are adjacent to the ground so that the void space 26 is filled mostly with air from above and from the ends of the air deflector 23 and this inhibits the natural turbulence which might otherwise combine with side winds to disperse the spraying chemicals. It is intended that the truck 36 should traverse pasture at a speed, in this case a minimum of 11 km/hour, and up to a maximum speed of 60 km/hour, and conveniently the air deflector 23 can depend vertically and in some cases needs only to be constituted by flat plates. However as in the first embodiment adjustment means of any known type are provided (not illustrated) which can adjust the slope of the air deflector 23.

I claim:

1. An apparatus for distributing high concentrate chemical solution in small quantities over a wide area, comprising
   a frame, vehicle attachment means on the frame, a plurality of spray heads on the frame, and
   a transversely extending air deflector carried by the frame and located forwardly of the spray heads, the air deflector having a sufficient downward component of direction that it exceeds a stalling angle of the air deflector when moved through the air at an operating speed, whereby a low pressure zone is created in said air behind the air deflector, which said zone contains vortexes, said spray heads being oriented to so direct spray into said low pressure zone that small droplets of spray are thrown downwardly against the area being traversed by said vortexes.

2. An apparatus according to claim 1 wherein said frame comprises elevating means, and pivot means cooperable between the elevating means and the air deflector supporting the air deflector from the frame.

3. An apparatus according to claim 2 wherein said frame comprises a vertically extending track, said elevating means comprises a carriage having track engaging means which guide the carriage for vertical movement along the track, and a windlass on the frame coupled to the carriage for effecting that said vertical movement.

4. An apparatus according to claim 2 wherein said elevating means comprises a transversely extending suspension frame which carries the air deflector.

5. An apparatus according to claim 4 further comprising adjustment means operable between the suspension frame and the air deflector to effect control of slope of the air deflector.

6. An apparatus according to claim 1 further comprising a flap of flexible material depending from the air deflector.

7. A method of spraying an area with a chemical solution, comprising the steps of:
providing a vehicle with tank means for carrying a quantity of the solution, a plurality of generally downwardly directed spray heads, means for conveying the solution from the tank means to the spray heads, an air deflector extending in a transverse direction relative to the vehicle and positioned in a forward longitudinal position relative to the spray heads, and means for adjusting a tilt angle of the air deflector;
driving the vehicle over the area to be sprayed at a speed of between about eleven kilometers per hour and about sixty kilometers per hour; and
controlling the tilt angle of the air deflector such that it exceeds a stalling angle of the air deflector whereby a low pressure zone is created behind the air deflector containing vortices and into which a quantity of droplets discharged from the spray heads is directed and thrown downwardly against the area being traversed;
whereby the amount of droplets that fall outside the area to be sprayed due to side winds will be minimized.

8. A method according to claim 1 wherein the chemical solution is a concentrated solution of a weedicide and water, the area to be sprayed is the ballast of a railway track and the vehicle is a truck adapted to drive along the track.

* * * * *